United States Patent [19]

Swisher, Jr. et al.

[11] Patent Number: 5,425,923

[45] Date of Patent: Jun. 20, 1995

[54] THERMAL SOIL REMEDIATION SYSTEM

[75] Inventors: George W. Swisher, Jr.; Jerry R. Collette, both of Oklahoma City, Okla.

[73] Assignee: CMI Corporation, Oklahoma City, Okla.

[21] Appl. No.: 966,999

[22] Filed: Oct. 27, 1992

[51] Int. Cl.⁶ .............................................. B01J 8/08
[52] U.S. Cl. .................................... 422/188; 422/168; 431/5
[58] Field of Search ...................... 422/168, 188; 431/5

[56] References Cited

U.S. PATENT DOCUMENTS

| | | | |
|---|---|---|---|
| 1,187,959 | 6/1916 | Ash. | |
| 2,654,592 | 10/1953 | Harris | 263/33 |
| 3,693,945 | 9/1972 | Brock | 259/146 |
| 3,705,711 | 12/1972 | Seelandt et al. | 263/32 R |
| 3,866,888 | 2/1975 | Dydzyk | 259/158 |
| 4,104,736 | 8/1978 | Mendenhall | 366/2 |
| 4,153,471 | 5/1979 | Mendenhall | 106/281 R |
| 4,211,490 | 7/1980 | Brock et al. | 366/11 |
| 4,298,287 | 11/1981 | McCarter, III et al. | 366/4 |
| 4,427,377 | 1/1984 | Dambrine et al. | 432/106 |
| 4,429,642 | 2/1984 | Deve | 110/236 |
| 4,555,182 | 11/1985 | Mendenhall | 366/25 |
| 4,575,336 | 3/1986 | Mudd et al. | 432/72 |
| 4,648,332 | 3/1987 | Geodhart | 110/346 |
| 4,648,333 | 3/1987 | Mudd et al. | 110/346 |
| 4,667,609 | 5/1987 | Hardison et al. | 110/236 |
| 4,700,638 | 10/1987 | Przewalski | 110/346 |
| 4,748,921 | 6/1988 | Mendenhall | 110/346 |
| 4,787,938 | 11/1988 | Hawkins | 106/281.1 |
| 4,827,854 | 5/1989 | Collette | 110/237 |
| 4,955,986 | 9/1990 | Maury et al. | 432/14 |
| 4,957,429 | 9/1990 | Mendenhall | 432/14 |
| 5,085,581 | 2/1992 | Mendenhall | 432/103 |

*Primary Examiner*—Timothy M. McMahon
*Attorney, Agent, or Firm*—Dunlap & Codding

[57] ABSTRACT

A system for remediating soil containing contaminants. The system comprises a rotary volatilizer, a thermal dust conductor, a soil cooler, a separator and an afterburner. The rotary volatilizer includes a rotatable, counterflow volatilizer drum with a drying zone, a heating zone and a burn zone. The burn zone of the volatilizer has an outer shell and a stainless steel inner liner supported by spring brackets within the outer shell. A separator is provided to receive exhaust gases from the volatilizer and the soil cooler and to remove dust from the exhaust gases. Dust from the separator and hot soil from the volatilizer is introduced into the thermal dust conductor. Hot gases from the thermal dust conductor are returned to the volatilizer to preheat combustion air for the volatilizer and to incinerate contaminants in the returned gases. Soil is transferred from the thermal dust conductor to the soil cooler, where water injection cools the remediated soil and adds moisture to the soil. The cool remediated soil is conveyed from the soil cooler to a load out hopper.

10 Claims, 5 Drawing Sheets

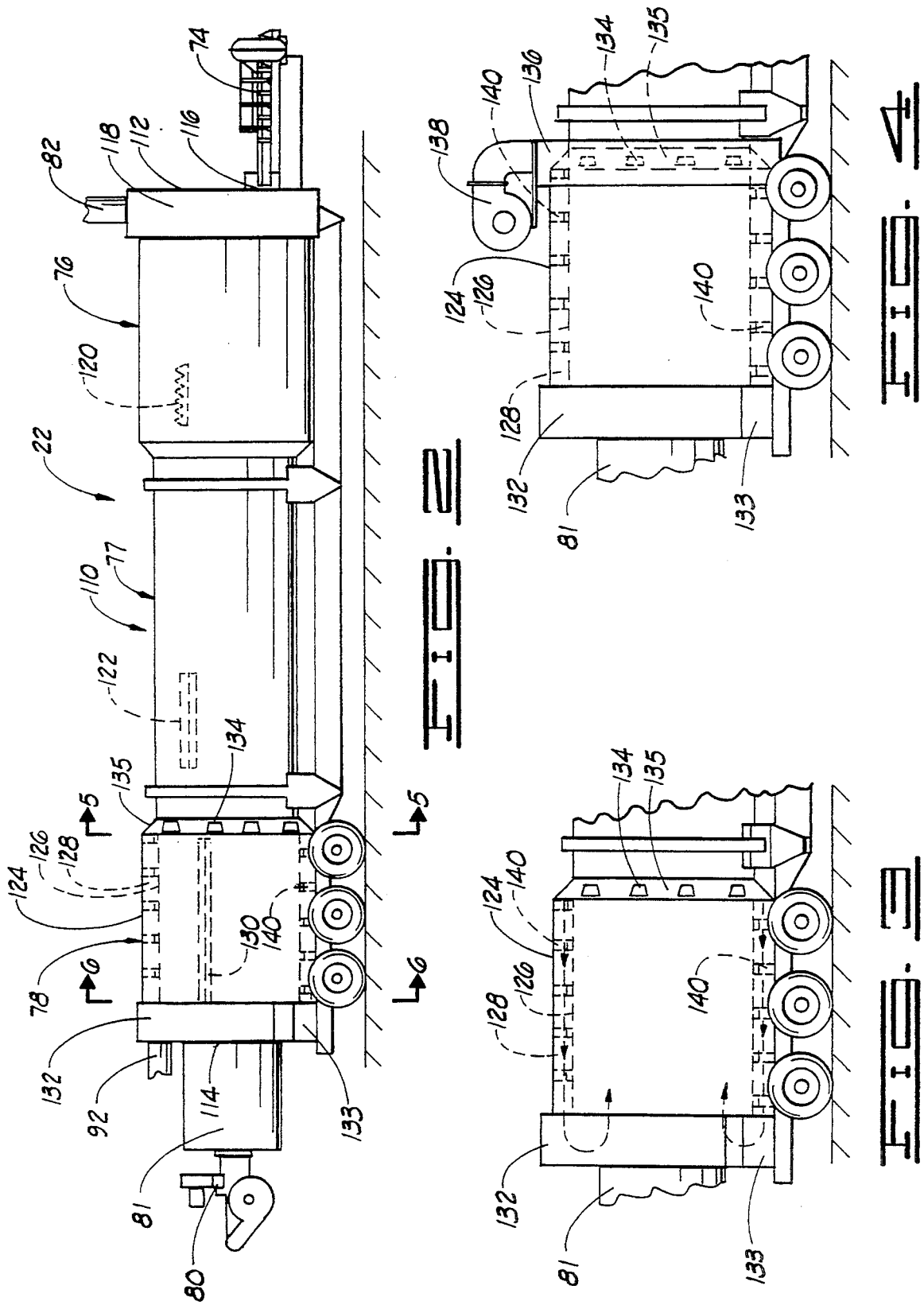

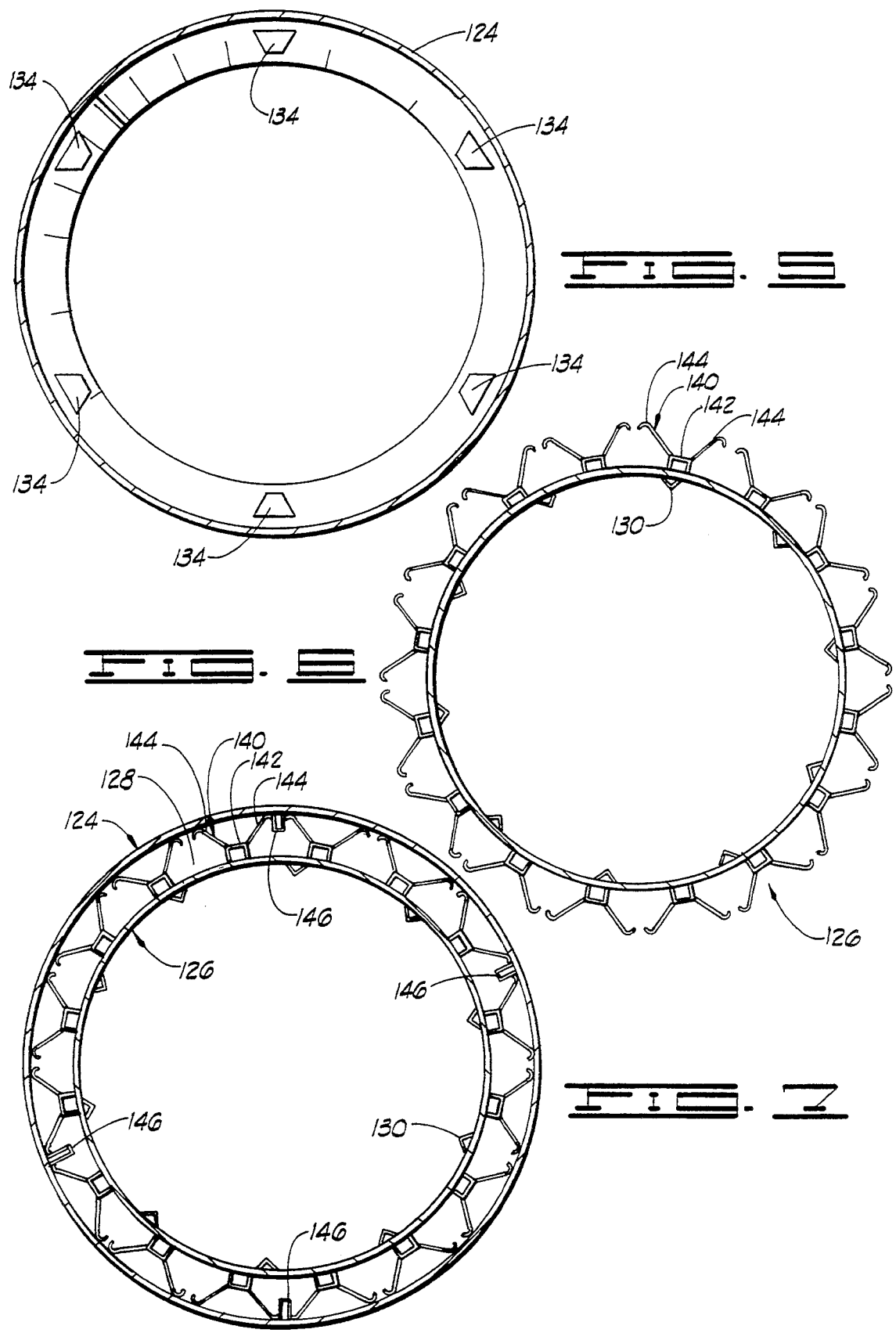

THERMAL SOIL REMEDIATION SYSTEM

BACKGROUND OF THE INVENTION

1. Field of the Invention

The present invention relates to systems for treating contaminated soil with high temperatures to remove hydrocarbons, polymers, resins and other contaminants from the soil.

2. Description of Related Art

Spills and leaks of contaminants into the soil are a common occurrence. Even with careful handling, accidental spills of contaminants are bound to occur. As storage tanks age, leaks eventually develop. Hydrocarbons, such as gasoline and aircraft fuel, are often a contamination problem in refueling areas. Other hydrocarbons may contaminate soil near processing facilities such as refineries and chemical plants.

Contaminated soil may be remediated or stored at a waste site. Because contaminants may leach from the soil at a waste site into the water table, lakes or streams, it is often preferable to extract the contaminants from the soil and to destroy the contaminants.

Various systems to remove hydrocarbons from soil have been designed and constructed. Some of these systems, such as the one disclosed in U.S. Pat. Nos. 4,957,429 and 5,085,581 issued to Mendenhall, volatilize the hydrocarbons in the soil and then incinerate the volatilized hydrocarbons. Light hydrocarbons, such as gasoline, are quite volatile and little heat is required to convert them to a vapor phase. In order to volatilize heavy hydrocarbons, however, temperatures of 1200° F. and higher are required. A difficulty with these systems has been in providing a volatilizer which is capable of withstanding the expansion and contraction, extreme temperatures and contaminated environment over an extended period of use.

SUMMARY OF THE INVENTION

The present invention comprises a rotary volatilizer, a thermal dust conductor, a soil cooler, a separator and an afterburner. A screening feed hopper and a scalping screen are provided to screen out soil having aggregate greater than a predetermined processing size. Two blending feed hoppers are used to blend soil having light contaminants with soil having heavy contaminants. A metal remover is also provided to extract ferrous materials from soil before processing the soil.

The volatilizer includes a burn zone having an inner stainless steel liner and an outer shell. The inner liner is supported within the outer shell by a plurality of spring brackets to allow expansion and contraction of the inner liner. The volatilizer converts the contaminants in the soil to vapors which are drawn from the volatilizer with the exhaust gases.

The separator includes an exhaust fan which draws exhaust gases from the volatilizer and the soil cooler through the separator. The separator is typically a fabric-filter baghouse which removes dust from the exhaust gases. The dust is conveyed into the thermal dust conductor to be mixed with soil from the volatilizer. The exhaust gases travel into the afterburner, which incinerates the volatilized contaminants in the exhaust gases.

The thermal dust conductor mixes hot soil from the volatilizer and dust from the separator to vaporize contaminants which may remain in the dust. The soil is then conveyed into the soil cooler where water is mixed with the soil to cool the soil and to add moisture to the soil.

The cool, clean soil is placed on a load out conveyor which carries the soil to a load out hopper or a soil stockpile. A power generator, energy center and control house are provided to power and control the functions of the soil remediation system. The control house includes a computerized control system for remotely monitoring, controlling and recording the operations of the system.

An object of the present invention is to provide a soil remediation system with a volatilizer which can operate under extreme temperature and corrosion conditions for an extended period of time.

Another object of the present invention is to provide a soil remediation system with a volatilizer with expansion and contraction capability in the hottest portion of the volatilizer.

Yet another object of the present invention is to provide a soil remediation system with a volatilizer having a liner which can be replaced.

Other advantages and features of the present invention are apparent from the following detailed description when read in conjunction with the accompanying drawings and appended claims,

BRIEF DESCRIPTION OF THE DRAWINGS

FIG. 2 is a side elevation of a rotary volatilizer in the thermal soil remediation system of FIG. 1.

FIG. 3 is a side elevation of the burn zone of the rotary volatilizer.

FIG. 4 is a side elevation of the burn zone of the rotary volatilizer having air breeching and an air blower.

FIG. 5 is a cross-sectional view of the outer shell of the rotary volatilizer of FIG. 2 taken along the lines 5—5.

FIG. 6 is a cross-sectional view of an inner liner in the rotary volatilizer of FIG. 2 taken along the lines 6—6.

FIG. 7 is a cross-sectional view of an inner liner installed in the outer shell in the rotary volatilizer of FIG. 2 taken along the lines 6—6.

DETAILED DESCRIPTION OF THE PREFERRED EMBODIMENTS

For the purposes of this disclosure, the term "soil" means any mixture of dirt, clay, sand and the like. "Soil aggregate" is used herein to mean pieces of soil. The pieces of soil may be small, such as those found in loose dirt and sandy loam, or large, such as dirt clods and chunks of rock or clay. The term "contaminants" is defined to mean any substance which can be volatilized from soil by heat into a vapor and then incinerated. Although such contaminants are typically hydrocarbon-based, the soil remediation disclosed herein is not restricted to soil containing hydrocarbons. The term "contaminants" includes, but is not limited to, gasoline, jet fuel, kerosene, lube oils, hydraulic oils, fuel oil, crude oil, non-hazardous polymers and resins, sludge, light hazardous creosote, and light hazardous coal tar pitch.

Figure 1:
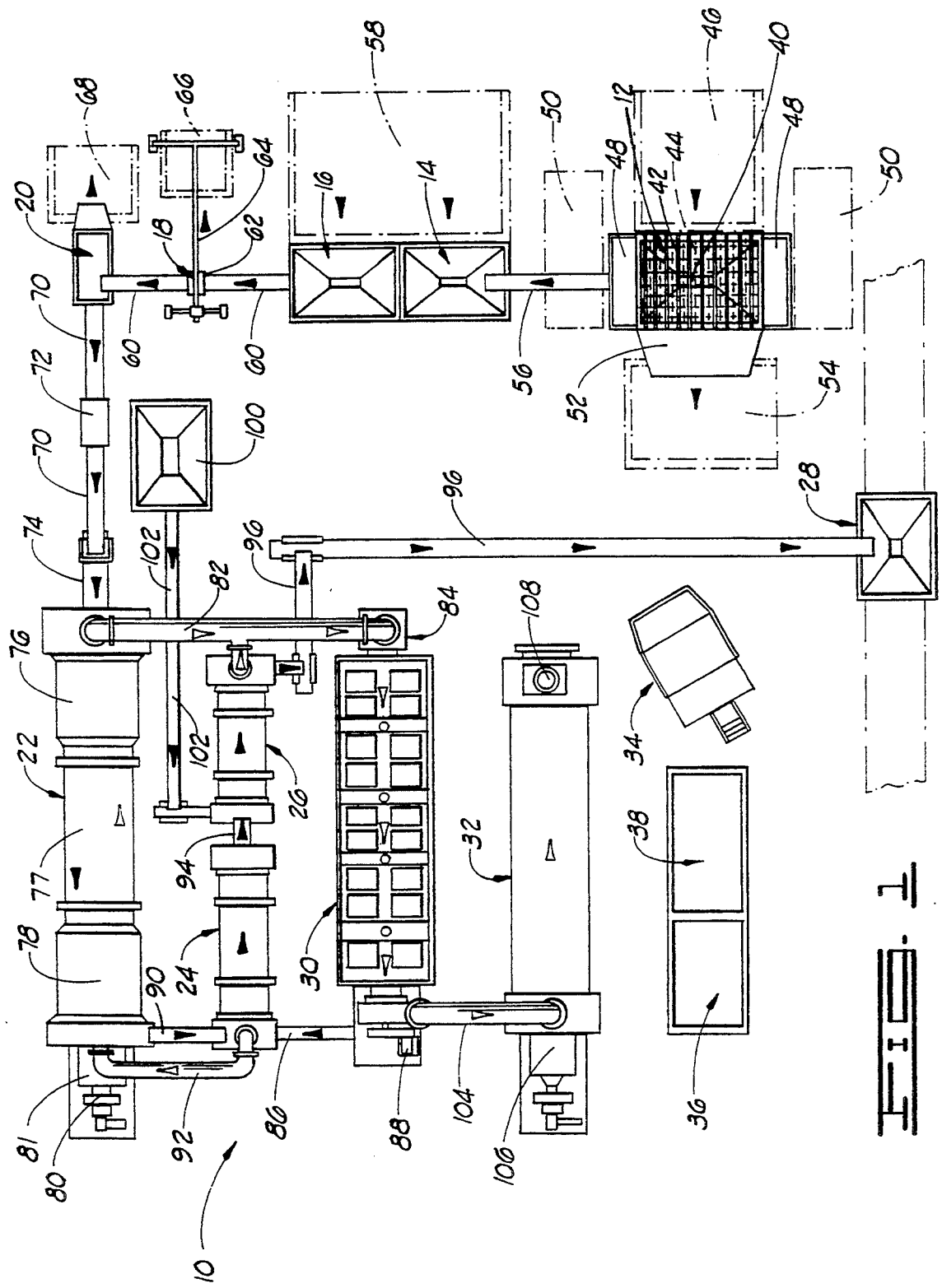
FIG. 1 is a plan view of a thermal soil remediation system constructed in accordance with the present invention.

Referring now to the drawings in general, and to FIG. 1 in particular, shown therein and designated by the general reference number 10 is a thermal soil remediation system constructed in accordance with the present invention. In referring to FIG. 1, it should be appreciated that the movement of solid, aggregate and particulate material is indicated generally by the solid arrows and the flow of gases and vapors is illustrated generally by the hollow arrows.

The soil remediation system 10 comprises a screening feed hopper 12, a pair of blending feed hoppers 14 and 16, a metal remover 18, a scalping screen 20, a rotary volatilizer 22, a thermal dust conductor 24, a soil cooler 26 and a load out hopper 28.

The system 10 also includes a separator 30 and an afterburner 32. A control house 34 is provided to monitor and control the operation of the system 10. A power generator 36 and an energy center 38 are included to supply and control power to the system 10.

With continued reference to FIG. 1, the major components of the soil remediation system 10 are shown. The screening feed hopper 12 is designed to receive incoming soil, to remove debris from the soil and to allow only soil aggregate of a predetermined size, such as four inches and less, to continue into the system 10. The screening feed hopper 12 has a lower end with tapered discharge opening 40 and an upper end with an access opening covered by a bar screen 42 and an oscillating screen 44 (indicated by dashed lines). A loading ramp 46 is necessary for access to the top of the screening feed hopper 12. The incoming material is typically dumped onto the bar screen 42 of the screening feed hopper 12 by front end loaders from the upper end of the loading ramp 46.

The bar screen 42, for example, has eight inch separation between its bars and is mounted at an incline above the screening feed hopper 12 to pick off debris and soil aggregate larger than eight inches in size. A pair of platforms 48 are positioned on opposing sides of the screening feed hopper 12 as stations for personnel to collect debris from the bar screen 42. The debris is deposited into portable debris containers 50 for transport to landfills. Typical debris includes plastic, visqueen, pipe, wood, canvas, tires and stumps.

Below the bar screen 42 and above the upper end of the screening feed hopper 12, the oscillating screen 44, such as a four-inch oscillating screen, is provided for further screening of the incoming material. Soil aggregate greater than four inches is scalped off and falls down an inclined chute 52 into a first aggregate containment area 54. The soil aggregate in the first aggregate container 54 is between four inches and eight inches in size and is collected and removed for crushing down to the processing size of, for example, two inches.

The soil aggregate which is less than four inches falls through the discharge opening 40 of the screening feed hopper 12 to a first feed conveyor 56. The first feed conveyor 56 transfers the four-inch and less soil aggregate to the first blending feed hopper 14.

With continued reference to FIG. 1, the blending feed hoppers 14 and 16 are positioned adjacent to one another and are serviced by a second loading ramp 58. The first blending feed hopper 14 receives soil aggregate from the screening feed hopper 12 and may also receive material from the second loading ramp 58. The second blending feed hopper 16 is intended solely for front end loader feeding from the second loading ramp 58. Additional feed hoppers may be added to the system 10 for storage and further blending.

A second feed conveyor 60 runs under the two blending feed hoppers 14 and 16. By adjusting the amount of material being discharged from each of the blending feed hoppers 14 and 16, the content of the soil aggregate deposited on the second feed conveyor 60 can be blended. It is often desirable to blend soil having light contaminants with soil containing heavy contaminants to produce an overall soil mixture having a concentration of contaminants which the system 10 remediates efficiently. It is further desirable to blend materials to achieve contaminant levels which remain below the lower explosive limit for safe operation of the volatilizer 22.

The second feed conveyor 60 carries soil aggregate past the metal remover 18. The metal remover 18 is provided to remove ferrous materials, which could damage components of the system 10, from the soil aggregate.

The metal remover 18 includes an electromagnet 62 suspended from a trolley rail 64 which runs over the second feed conveyor 60 and a metal containment 66. The electromagnet 62 is mounted on the trolley rail 64 to move back and forth between a collecting position over the second feed conveyor 60 and an unloading position over the metal containment 66.

After the ferrous metals have been removed, soil aggregate travels on the second feed conveyor 60 to the scalping screen 20, such as a two-inch scalping screen. The scalping screen 20 is an inclined screen constructed to reject all soil aggregate which is two inches or larger. A second aggregate containment 68 is provided for the collection of the two inch and larger soil aggregate, which must be crushed into smaller sizes before being remediated.

All soil aggregate leaving the scalping screen 20 is, for example, less than two inches in size. Although a larger or smaller size could be chosen, two inches is selected as the maximum processing size for soil aggregate. Chunks of soil and clay which are larger than two inches may not be adequately penetrated by the thermal process to remediate contaminants in the center of the chunks. Accordingly, it is helpful to remove chunks which are two inches or larger from further processing.

A first transfer conveyor 70 runs from the scalping screen 20 over a belt scale 72 to a slinger feed conveyor 74. The belt scale 72 continuously weighs all material entering the soil remediation process. The belt scale 72 is provided with electronic remote operator readout capability and a recorder to log all soil tonnage entering the soil remediation process. The slinger feed conveyor 74 feeds the screened soil into the rotary volatilizer 22.

Continuing to refer to FIG. 1, the rotary volatilizer 22 is a counterflow rotary drum which elevates soil temperatures to convert soil contaminants to a vapor phase for removal of the contaminants through the exhaust gas stream. Some of the contaminants are destroyed within the rotary volatilizer 22 and the remainder of the contaminants, volatilized in the exhaust gases, are incinerated downstream in the afterburner 32.

The rotary volatilizer 22 has a drying zone 76, a heating zone 77 and a burn zone 78. The drying zone 76 receives cold, wet soil and includes high density veiling flights for cascading the soil to remove moisture from the soil. Heat is provided by a burner 80 through a combustion chamber 81 located at the discharge end of the volatilizer 22.

The heating zone 77 includes non-veiling tumbler flights for good heat transfer by convection and conduction. By not veiling in the heating zone 77, the amount of dust entering the exhaust gas stream from the soil is reduced.

In the burn zone 78, the soil reaches temperatures as high as 1,200 degrees Fahrenheit to vaporize all remaining hydrocarbons in the soil. The burn zone 78 includes a stainless steel liner with stainless steel tumbler flights to provide good heat transfer and soil contact with the high temperature conductive heat surfaces. As in the heating zone 77, there is no veiling of the soil in order to reduce the amount of dust becoming entrained in the exhaust gas stream. The preferred detailed construction of the burn zone 78 is discussed below in connection with FIGS. 2 through 7.

The rotary volatilizer 22 is equipped with variable speed control and variable slope control to adjust soil retention time from about 8 minutes to approximately 45 minutes to assure remediation of all hydrocarbons regardless of the density of the contaminant.

Continuing to refer to FIG. 1, the separator 30 is typically a fiber-filter baghouse of known design which receives dust-laden exhaust gases and removes particulate material from the exhaust gases. A main exhaust duct 82 extends from the inlet end of the volatilizer 22 to the separator 30 to transfer gases from the volatilizer 22 to the separator 30.

The separator 30 includes an inertial collector 84 at its inlet end to separate out coarser dust before the exhaust gases enter the baghouse itself. As described hereinafter, the inertial collector 84 utilizes the inertia of dust particles to separate the dust particles from the exhaust gas stream.

Dust removed from the exhaust gases is collected by the separator 30 and transferred to the thermal dust conductor 24. A dust conveyor 86, typically a screw conveyor, is provided to carry dust from the separator 30 to the thermal dust conductor 24.

An exhaust fan 88 is provided to draw exhaust gases from the volatilizer 22 and the soil cooler 26 into and through the separator 30. The exhaust fan 88 also pumps the substantially dust-free exhaust gases to the afterburner 32 for incineration of volatilized contaminants.

With continued reference to FIG. 1, the thermal dust conductor 24 is basically a rotatable drum having an inner periphery with a plurality of tumbler flights for mixing material. It should be appreciated that the thermal dust conductor 24 has no burner of its own and heats only by thermal conductivity. The thermal dust conductor 24 receives soil from the rotary volatilizer 22 and dust from the separator 30. Within the thermal dust conductor 24, the heat of the soil is used to remediate the dust collected by the separator 30. Thus the thermal dust conductor 24 volatilizes contaminants in the dust by conductively heating the dust with hot soil from the rotary volatilizer 22.

An exhaust return duct 92 extends from the thermal dust conductor 24 to the volatilizer 22. Contaminants volatilized from the dust are carried by the return duct 92 into the volatilizer 22 and are incinerated in the combustion zone of the volatilizer 22. The soil and dust mixture is discharged from the thermal dust conductor 24 and is carried into the soil cooler 26.

The soil cooler 26 is a rotatable drum with staged water injection for cooling and moisturizing hot soil received from the thermal dust conductor 24. The soil cooler 26 is designed to reduce the soil temperature below 130° F. and to raise the moisture content of the soil to the approximate range of 5% to 8% for dust free soil handling. The water injection is staged to allow time for the soil to cool and to reduce the volume of steam produced by combining water with the hot soil. The cold, wet soil exits the soil cooler 26 by gravity onto a load out conveyor 96 which carries the soil to the load out hopper 28.

In another preferred embodiment, a cold, clean soil feed hopper 100 and a cold soil feed conveyor 102 are provided to introduce cold, clean soil into the soil cooler 26 with the hot soil from the thermal dust conductor 24. The cold, clean soil is used as an additional cooling medium and reduces the amount of water required and the volume of steam produced in the soil cooler 26.

The load out hopper 28 is typically a portable self-erect surge system which is known in the art. Although the load out hopper 28 is typically utilized in the soil remediation system 10, any suitable apparatus for storing the clean soil may be employed. For example, a conventional stacking conveyor (not shown) may be used simply to stockpile the clean soil.

An exhaust gas duct 104 extends between the outlet end of the separator 30 and the inlet to the afterburner 32 to transfer gases with volatilized contaminants from the separator 30 to the afterburner 32. The afterburner 32 includes a burner 106 for incinerating volatilized contaminants in the exhaust gases and a stack 108 for release of gases from the afterburner 32 after incineration.

As shown in FIG. 1, the soil remediation system 10 may include a plant control system which comprises the plant control house 34, the power generator 36 and the energy center 38. The plant control system typically provides complete operational control of the soil remediation system 10 from a central operating console. A suitable computerized system is used for start-up, operation and shutdown of all components of the soil remediation system 10. In addition, the plant control system monitors and records the functions of the soil remediation system 10.

With reference now to FIG. 2, the rotary volatilizer 22 includes a counterflow volatilizer drum 110 with an inlet end 112 and a discharge end 114. The volatilizer drum 110 is rotatable by a chain sprocket drive or other suitable drive mechanism about a longitudinal axis extending between the inlet end 112 and the discharge end 114 of the volatilizer drum 110. The volatilizer drum 110 is adapted in a conventional manner to be inclined for gravity feeding of material from the inlet end 112 to the discharge end 114 of the volatilizer drum 110.

The inlet end 112 has an inlet opening 116 for receiving soil from the slinger feed conveyor 74. An inlet breeching 118 is located at the inlet end 112 of the volatilizer drum 110. The main exhaust duct 82 communicates with the inlet breeching 118 to carry exhaust gases from the volatilizer drum 110 to the separator 30.

As mentioned previously, the volatilizer drum 110 is divided into the drying zone 76, the heating zone 77 and the burn zone 78. The drying zone 76 has an inner periphery with a plurality of veiling flights to lift or cascade the soil as the volatilizer drum 110 is rotated. One of the veiling flights of the drying zone 76 is designated by reference numeral 120 and is generally representative of the veiling flights in the drying zone 76 of the volatilizer drum 110. For clarity of illustration, only one veiling flight 120 is shown in FIG. 2. The veiling flights 120 extend inward from the inner periphery of the volatilizer drum 110 and have sawtooth ends for lifting and cascading the soil.

The heating zone 77 of the volatilizer drum 110 is designed to subject the soil to more and more heat as the soil travels from the inlet end 112 to the discharge end 114 of the volatilizer drum 110. The heating zone 77 is constructed to heat the soil without producing a great deal of dust. Therefore, the inner periphery of the heating zone 77 has a plurality of tumbler flights, which merely mix the soil and do not lift and cascade the soil.

The tumbler flights are substantially V-shaped in cross-section, with the legs of the vee secured to the inner periphery of the drum and the apex of the vee protruding from the inner periphery of the drum. One of the tumbler flights of the heating zone 77 is designated by reference numeral 122 and is generally representative of the tumbler flights in the heating zone 77 of the volatilizer drum 110. For purposes of clarity, only one tumbler flight 122 is shown in FIG. 2.

With continued reference to FIG. 2, the burn zone 78 of the volatilizer drum 110 includes an outer shell 124 and an inner liner 126. The outer shell 124 of the burn zone 78 has a larger diameter than the heating zone 77, while the inner liner 126 has a diameter substantially the same as the heating zone 77. It should be appreciated that soil passes through the inner liner 126 and that there is an annulus 128 for air flow between the inner liner 126 and the outer shell 124. The inner liner 126 typically comprises stainless steel in order to withstand the rigors of being subjected to contaminated materials at the extreme temperatures of the burn zone 78.

The inner liner 126 has an inner periphery with a plurality of tumbler flights for mixing the soil passing through the inner liner 126. One of the tumbler flights of the inner liner 126 is designated by reference numeral 130 and is generally representative of the tumbler flights of the inner liner 126. The tumbler flights 130 are generally shaped like the tumbler flights 122 previously described and typically comprise stainless steel to withstand the adverse environment. For clarity of illustration, only one tumbler flight 130 is shown in FIG. 2.

A discharge breeching 132 is located at the discharge end 114 of the volatilizer drum 110. The discharge breeching 132 has a discharge opening 133 for the discharge of soil from the volatilizer drum 110. A combustion system including the combustion chamber 81 and the volatilizer burner 80 is located at the discharge end 114 of the volatilizer drum 110 to supply heat into the volatilizer drum 110. The exhaust return duct 92 communicates into the discharge breeching 132 to carry hot exhaust gases from the thermal dust conductor 24 into the discharge breeching 132 of the volatilizer 22. The hot exhaust gases from the thermal dust conductor 24 preheat combustion air for the burner 80 of the rotary volatilizer 22.

In order to achieve temperatures of 1200° F. and higher in the burn zone 78 of the volatilizer drum 110, as much heat as possible should be forced inside the inner liner 126 and as little heat as possible should be allowed to pass through the inner liner 126 to the outer shell 124. To address this objective, the outer shell 124 is constructed to force heat from between the inner liner 126 and the outer shell 124 back inside the inner liner 126.

With reference to FIGS. 2 through 5, a plurality of air openings 134 extend through the inlet end 135 of the outer shell 124 and communicate with the annulus 128 between the outer shell 124 and the inner liner 126. As indicated by the direction arrows in FIG. 3, ambient air is drawn through the air openings 134, the annulus 128, the discharge breeching 132 and into the inner liner 126. This air flow effectively sweeps hot air from the annulus 128 and into the inner liner 126 to reduce the temperature of the outer shell 124 and to introduce more heat into the inner liner 126.

In another preferred embodiment illustrated by FIG. 4, air breeching 136 is provided to surround the air openings 134 of the outer shell 124 and an air blower 138 is used to force air into the air openings 134. The forced air provided by the air breeching 136 and air blower 138 may be designed to supply more air flow than the unforced air system described previously. Moreover, the air blower 138 may have controls for adjusting the air output of the air blower 138.

With reference now to FIG. 6, the inner liner 126 has an outer periphery with a plurality of spring brackets 140 for supporting the inner liner 126 within the outer shell 124. Each spring bracket 140 has a bracket base 142, which is rigidly attached to the outer periphery of the inner liner 126, and two spring legs 144 connected to the bracket base 142. This construction allows the inner liner 126 to expand and contract within the outer shell 124 and permits easy replacement of the inner liner 126.

Referring now to FIG. 7, the inner shell 126 is shown installed within the outer shell 124. The outer shell 124 has an inner periphery with four stops 146 toward each end of the inner liner 126. The stops 146 engage at least one of the spring brackets 140 to ensure that the inner liner 126 rotates with the outer shell 124 when the volatilizer drum 110 is rotated.

Figure 8:
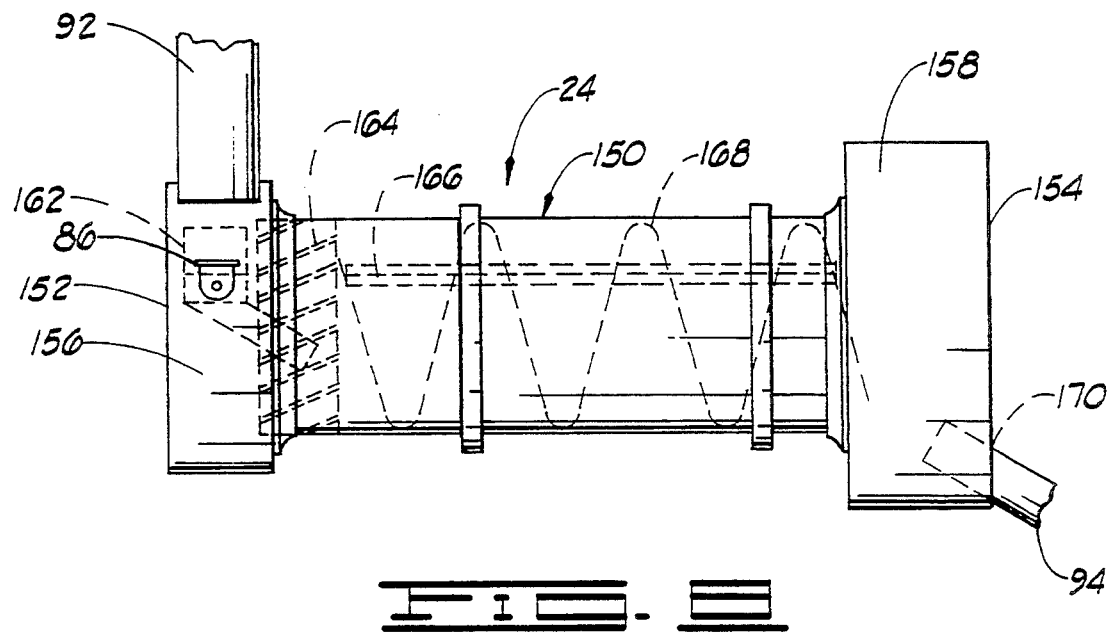
FIG. 8 is a side elevation of a thermal dust conductor in the thermal soil remediation system of FIG. 1.

Turning now to FIG. 8, the thermal dust conductor 24 is basically a conductor drum 150 having an inlet end 152 and a discharge end 154. The conductor drum 150 is rotatable about a longitudinal axis extending between the inlet end 152 and the discharge end 154. In addition, the conductor drum 150 is adapted in a conventional manner to be inclined for gravity feeding of material from the inlet end 152 to the discharge end 154 of the conductor drum 150.

Inlet breeching 156 is located at the inlet end of the conductor drum 150 and discharge breeching 158 is located at the discharge end 154 of the conductor drum 150. The inlet breeching 156 of the conductor drum 150 has a soil inlet chute 162 for receiving hot soil into the conductor drum 150 and a dust inlet opening 162 for receiving dust into the conductor drum 150.

Toward its inlet end 152, the conductor drum 150 has an inner periphery with a plurality of kicker flights for urging soil and dust into the conductor drum 150. One of the kicker flights is designated by reference numeral 164 and is generally representative of the kicker flights of the conductor drum 150.

In an intermediate area of the conductor drum 150, the inner periphery of the conductor drum 150 has a plurality of tumbler flights. The tumbler flights are similar to those tumbler flights previously described. One of the tumbler flights of the conductor drum is designated by reference numeral 166 and is generally representative of the tumbler flights of the conductor drum 150.

The inner periphery of the conductor drum 150 also includes an advancing screw blade 168 which runs spirally from a point near the kicker flights 164 to the discharge breeching 158. The advancing screw blade 168 urges the soil and dust through the conductor drum 150 as the conductor drum 150 is rotated.

The exhaust return duct 92 communicates with the inlet breeching 156 to carry hot gases out of the conductor drum 150 to the volatilizer drum 110 for preheating combustion air of the volatilizer 22, and destroying all vaporized contaminants volatilized from the dust.

The discharge breeching 158 of the conductor drum 150 has a discharge opening 170 for the discharge of soil and dust to a transfer chute 94 for gravity transport from the thermal dust conductor 24 to the soil cooler 26.

Figure 9:
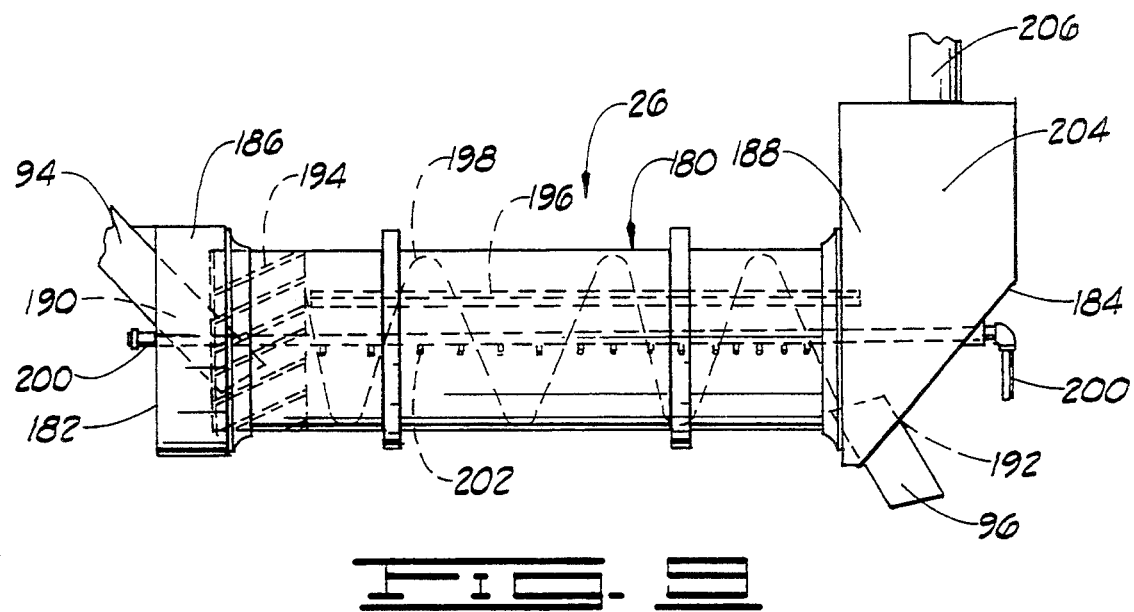
FIG. 9 is a side elevation of a soil cooler in the thermal soil remediation system of FIG. 1.

With reference now to FIG. 9, the soil cooler 26 is basically a cooler drum 180 with an inlet end 182 and a discharge end 184. The cooler drum 180 is rotatable about a longitudinal axis extending from the inlet end 182 to the discharge end 184 of the cooler drum 180. In addition, the cooler drum is adapted in a conventional manner to be inclined for gravity feeding of material from the inlet end 182 to the discharge end 184 of the cooler drum 180.

Inlet breeching 186 is located at the inlet end 182 of the soil cooler drum 180 and discharge breeching 188 is located at the discharge end 184 of the soil cooler drum 180. The inlet breeching 186 has an inlet opening 190 for receiving hot soil from the transfer chute 94. Similarly, the discharge breeching 188 has a discharge opening 192 for discharging cool soil from the soil cooler drum 180.

Toward its inlet end 182, the soil cooler drum 180 has an inner periphery with a plurality of kicker flights. One of the kicker flights is designated by reference numeral 194 and is generally representative of the kicker flights of the soil cooler drum 180. The kicker flights 194 urge the hot soil from the inlet opening 190 into the soil cooler drum 180.

The inner periphery of the soil cooler drum 180 has a plurality of tumbler flights located between the kicker flights 194 and the discharge breeching 188. The tumbler flights of the soil cooler drum are similar to the tumbler flights previously described. One of the tumbler flights is designated by reference numeral 196 and is generally representative of the tumbler flights of the soil cooler drum 180.

The inner periphery of the soil cooler drum 180 also has a screw blade 198 which runs spirally from a point near the kicker flights 194 to the discharge breeching 188. The screw blade 198 helps to advance the soil from the inlet end 182 to the discharge end 184 of the soil cooler drum 180 as the soil cooler drum 180 is rotated.

Continuing to refer to FIG. 9, a water injection pipe 200 extends into the soil cooler drum 180. The water injection pipe 200 includes a plurality of water nozzles for injecting water into the soil cooler drum 180 along the length of the water injection pipe 200 between the kicker flights 194 and the discharge breeching 188. One of the water nozzles is designated by reference numeral 202 and is generally representative of the water nozzles of the soil cooler drum 180.

It should be appreciated that the water nozzles 202 are not evenly spaced along the length of the water injection pipe 200. The spacing between water nozzles 202 is greatest toward the inlet end 182 and gradually becomes smaller toward the discharge end 184. This arrangement of the water nozzles 202 reduces the amount of steam produced when the water contacts the hot soil from the thermal dust conductor 24. Less water is introduced toward the inlet end 182, where the soil is hottest, and more water is injected toward the discharge end 184, where the soil is lower in temperature.

With continued reference to FIG. 9, a steam expansion chamber 204 is provided at the discharge end 184 of the soil cooler drum 180. An exhaust duct 206 connects the steam expansion chamber 204 with the main exhaust duct 82 to carry gases from the soil cooler 26 to the separator 30.

Figure 10:
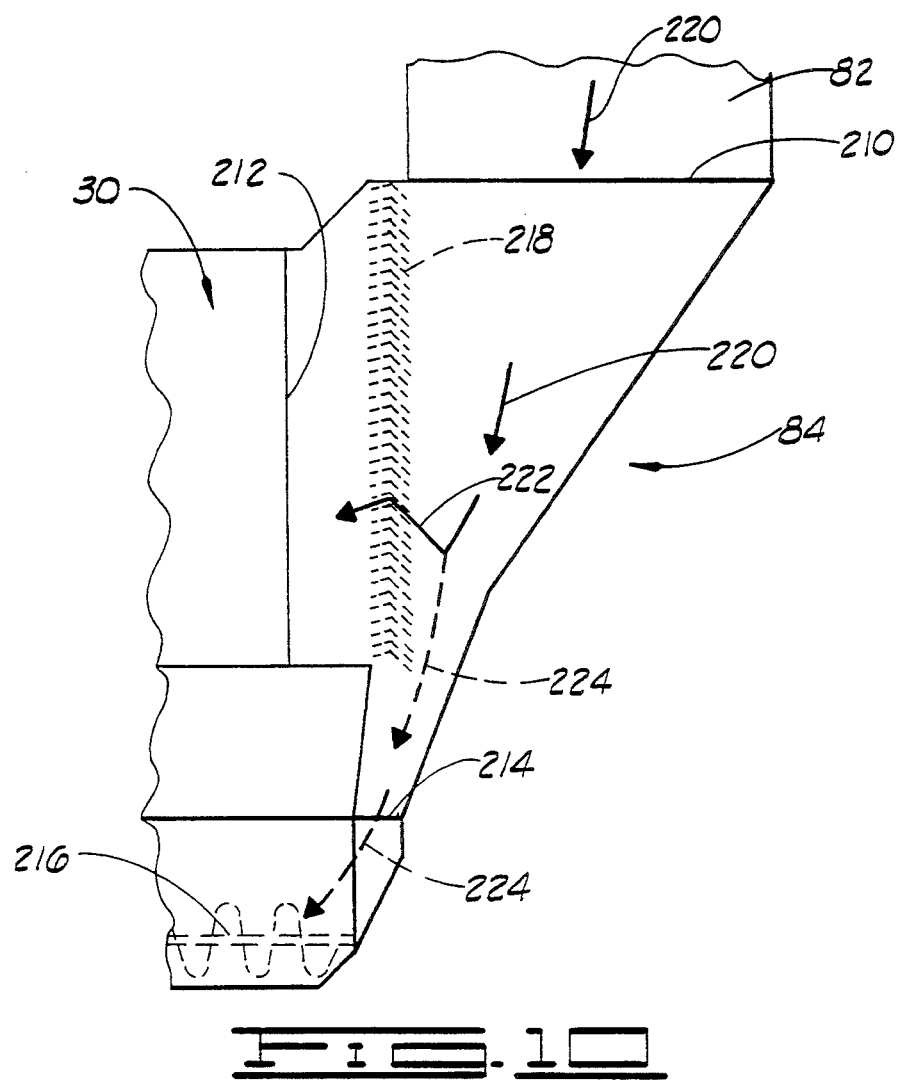
FIG. 10 is a side elevation of an inertial collector of the soil remediation system of FIG. 1.
Figure 11:
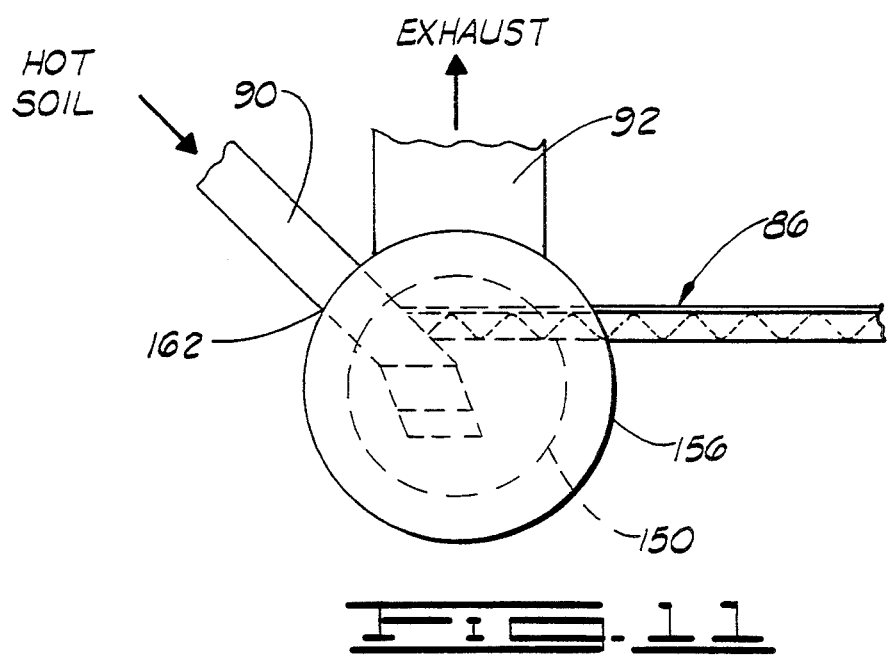
FIG. 11 is an end view of the thermal dust conductor illustrating the introduction of hot soil and dust into the thermal dust conductor drum.

Turning now to FIGS. 10 and 11, various aspects of the system 10 for handling exhaust gases and dust are described. As shown in FIG. 10, the inertial collector 84 is attached to the inlet end of the fabric filter baghouse separator 30. The inertial collector 84 is basically a chamber with an upper inlet 210 for dust laden gases, a side gas outlet 212 and a lower dust outlet 214. A screw conveyor 216 extends beneath the inertial collector 84 and separator 30 from the lower dust outlet 214 to the dust conveyor 86 and transfers dust from the inertial collector 84 into the dust conveyor 86.

A plurality of closely spaced diverter plates extend across the interior of the inertial collector 84 between the upper inlet 210 and the side outlet 212. One of the diverter plates is designated by reference numeral 218 and is generally representative of the diverter plates within the inertial collector 84. The diverter plates 218 are bent and positioned such that gases must change direction and pass between two of the diverter plates 218 in order to travel from the upper inlet 210 to the side outlet 212.

As indicated by direction arrows 220 in FIG. 10, exhaust gases enter through the upper inlet 210 of the inertial collector 84 from the main exhaust duct 82. The exhaust gases abruptly change direction, as shown by direction arrow 222, to pass into the separator 30. Dust particles, however, have a greater mass than the gases and cannot change direction so readily. Accordingly, dust particles are forced downward through the lower outlet 214 and into the screw conveyor 216, as illustrated by direction arrows 224.

Referring now to FIG. 11, the introduction of dust into the thermal conductor drum 150 is therein illustrated. It is desirable that volatilized contaminants from the dust, but not the dust, enter the return duct 92. Therefore, the dust conveyor 86 communicates directly with the hot soil transfer chute 90. Hot soil from the transfer chute 90 is laid over dust from the dust conveyor 86 before the dust and soil enter the thermal conductor drum 150. In this manner, as little dust as possible is drawn into the return duct 92.

It should also be appreciated that only a slight vacuum is placed on the exhaust return duct 92. Having such a slight vacuum on the return duct 92 further assists in leaving the dust with the soil in the thermal conductor drum 150.

Operation

The operation of the thermal soil remediation system 10 is best understood with reference to FIG. 1. As described previously, front end loaders are typically driven up the first loading ramp 46 to load contaminated soil onto the bar screen 42 of the screening feed hopper 12o Personnel on the primary feed hopper platforms 48 remove large debris, such as tires and stumps, from the bar screen 42. The large debris is placed in one of the debris containments 50. The bar screen 42 prevents debris from dropping onto the oscillating screen 44 and the oscillating screen 44, in turn, rejects objects larger than about four inches into the first aggregate containment 54. Soil which is not rejected, that is, soil aggregate less than about four inches in size, is conveyed to the first blending feed hopper 14.

Front end loaders may use the second loading ramp 58 to load contaminated soil into either one of the blending feed hoppers 14 and 16. Soil placed directly into the blending feed hoppers 14 and 16 should be soil which has been crushed or processed to have soil aggregate sizes no larger than the maximum processing size of about two inches.

Typically, soil containing heavy contaminants is loaded into one of the blending feed hoppers 14 and 16 and soil with light contaminants is loaded into to the other of the blending feed hoppers 14 and 16. In this way, amounts of soil from each blending feed hopper 14 and 16 can be adjusted to produce an overall soil mixture which is efficiently processed by the soil remediation system 10.

The contaminated soil mixture is conveyed through the metal remover 18 to extract ferrous materials from the soil. The second feed conveyor 60 operates in a stop and go fashion, stopping while the electromagnet 62 passes over the soil and advancing while the electromagnet 62 carries ferrous materials to the metal containment 66, drops ferrous materials into the metal containment 66 and returns to the second feed conveyor 60.

With continued reference to FIG. 1, the soil is conveyed to the scalping screen 20, which rejects soil aggregate larger than a predetermined size, such as two inches, into the second aggregate containment 68. Accordingly, all soil aggregate entering the balance of the soil remediation system 10 is less than two inches in size. The oversized soil aggregate from the first aggregate containment 54 and the second aggregate containment 68 is crushed or chopped into smaller sizes before being introduced back into the screening feed hopper 12 or into one of the blending feed hoppers 14 and 16.

The soil is weighed by the belt scale 72 before reaching the slinger feed conveyor 74, which introduces the soil into the volatilizer 22. As the soil travels through the volatilizer 22, contaminants in the soil are volatilized into vapors commingled in the exhaust gas stream. The hot, dry soil is discharged from the volatilizer 22 and is conveyed into the thermal dust conductor 24.

Meanwhile, exhaust gases are drawn by the exhaust fan 88 from the inlet end of the volatilizer 22 into the separator 30, where dust is removed from the exhaust gases. The dust conveyor 86 carries dust from the separator 30 into the thermal dust conductor 24 for mixing with the hot, dry soil from the volatilizer 22. The exhaust gases from the separator 30, which are substantially dust-free but contain volatilized contaminants, travel to the afterburner 32. The afterburner 32 incinerates the volatilized contaminants in the exhaust gases.

Turning attention back to the thermal dust conductor 24, the hot soil and dust are mixed in the thermal dust conductor 24 and then conveyed into the soil cooler 26 to be cooled down. The exhaust return duct 92 carries hot gases from the thermal dust conductor 24 to the volatilizer 22. The returned hot gases preheat ambient air for the burner 80 of the volatilizer 22 and the combustion of the volatilizer 22 incinerates volatilized contaminants in the returned gases.

The soil cooler 26 mixes water with the hot soil from the thermal dust conductor 24 to cool down and moisturize the remediated soil. Alternatively, cold, clean soil is introduced into the soil cooler 26 to reduce the amount of water required in the soil cooler 26 and to diminish the quantity of steam produced in the soil cooler 26. The cool, moisturized soil is discharged from the soil cooler 26 to the load out conveyor 96, which carries the soil to the load out hopper 28. The main exhaust duct 82 communicates with the discharge end of the soil cooler 26 to draw gases out of the soil cooler 26 and into the separator 30.

Changes may be made in the combinations, operations and arrangements of the various parts and elements described herein without departing from the spirit and scope of the invention defined in the following claims.

What is claimed is:

1. A soil remediation system comprising:

a rotatable volatilizer drum having an inlet end and a discharge end, said volatilizer drum including means for introducing soil into said volatilizer drum at the inlet end thereof, means for moving soil from the inlet end to the discharge end thereof, and means for discharging soil out of said volatilizer drum at the discharge end thereof;

burner means, located at the discharge end of said volatilizer drum, for introducing hot combustion gases into said volatilizer drum to volatilize contaminants present in the soil in said volatilizer drum;

a rotatable mixer drum having an inlet end and a discharge end, said mixer drum including means for introducing soil and dust into said mixer drum at the inlet end thereof, means for moving soil and dust from the inlet end to the discharge end thereof, and means for discharging a mixture of soil and dust out of said mixer drum at the discharge end thereof;

separator means, communicating with said volatilizer drum, for receiving gases from said volatilizer drum, said separator means being adapted to segregate dust from gases;

exhaust means for drawing gases out of said mixer drum and into said volatilizer drum and for drawing gases out of said volatilizer drum and into said separator means;

means for introducing dust from said separator means into said mixer drum; and means for introducing heated soil discharged out of said volatilizer drum into said mixer drum;

wherein the heated soil in said mixer drum volatilizes contaminants present in the dust in said mixer drum.

2. The soil remediation system of claim 1 wherein said volatilizer drum further comprises:

veiling means, within said volatilizer drum toward the inlet end thereof, for cascading soil as said volatilizer drum is rotated.

3. The soil remediation system of claim 1 wherein said volatilizer drum further comprises:

means, within said volatilizer drum from a medial portion to the discharge end thereof, for tumbling soil as said volatilizer drum is rotated.

4. The soil remediation system of claim 1 wherein said volatilizer drum further comprises:

an outer shell located toward the discharge end thereof;

an inner liner having an inner periphery and an outer periphery, said inner liner being positioned within said outer shell to define an annulus between said outer shell and said inner liner; and means between said inner liner and said outer shell for allowing expansion and contraction of said inner liner within said outer shell.

5. The soil remediation system of claim 4 wherein said inner liner comprises stainless steel.

6. The soil remediation system of claim 4 wherein said outer shell has a plurality of air openings therethrough communicating with the annulus between said outer shell and said inner liner.

7. The soil remediation system of claim 6 wherein said volatilizer drum further comprises:

an outer collar surrounding the air openings through said outer shell; and blower means for forcing air into said outer collar and through the air openings of said outer shell and into the annulus between said outer shell and said inner liner.

8. The soil remediation system of claim 1 further comprising:

a rotatable cooler drum having an inlet end, a discharge end, means for transferring the mixture of soil and dust discharged from said mixer drum into said cooler drum at the inlet end thereof, means for moving the mixture of soil and dust from the inlet end to the discharge end thereof, and means for discharging the mixture of soil and dust out of said cooler drum at the discharge end thereof; and water injection means for spraying water within said cooler drum.

9. The soil remediation system of claim 8 further comprising:

means for drawing gases out of said cooler drum and into said separator means.

10. The soil remediation system of claim 1 further comprising:

an afterburner having means for incinerating volatilized contaminants; and means for drawing gases out of said separator means and into said afterburner.

* * * * *